(12) United States Patent
Suzuki et al.

(10) Patent No.: US 9,266,385 B2
(45) Date of Patent: Feb. 23, 2016

(54) MOLDED RESIN PRODUCT AND PROCESS FOR SURFACE TREATMENT THEREOF

(75) Inventors: Kazuo Suzuki, Tokyo (JP); Hideyoshi Kamashima, Tokyo (JP); Takayuki Sunagawa, Tokyo (JP); Shinji Shimada, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 138 days.

(21) Appl. No.: 13/334,576

(22) Filed: Dec. 22, 2011

(65) Prior Publication Data

US 2012/0135162 A1   May 31, 2012

Related U.S. Application Data

(62) Division of application No. 12/224,315, filed as application No. PCT/JP2007/057272 on Mar. 30, 2007.

(30) Foreign Application Priority Data

Mar. 31, 2006 (JP) ................................. 2006-099176
Apr. 28, 2006 (JP) ................................. 2006-125619
Jun. 29, 2006 (JP) ................................. 2006-179454

(51) Int. Cl.
*B32B 37/02* (2006.01)
*B44F 1/04* (2006.01)
(Continued)

(52) U.S. Cl.
CPC ................. *B44F 1/045* (2013.01); *B32B 27/00* (2013.01); *B32B 37/02* (2013.01); *C08J 7/06* (2013.01); *B32B 2307/416* (2013.01); *Y10T 428/24777* (2015.01); *Y10T 428/24868* (2015.01)

(58) Field of Classification Search
CPC .............. B44F 1/04; B44F 1/045; B44F 3/00; B41M 3/008; G02B 27/2221; B32B 37/02; B32B 2307/416
USPC .................. 156/233, 234, 241; 428/203, 204; 359/478, 479, 297
See application file for complete search history.

(56) References Cited

U.S. PATENT DOCUMENTS 3,011,383 A * 12/1961 Sylvester et al. ............. 359/584
4,375,730 A *  3/1983 Sanders et al. ................. 40/518
(Continued)

FOREIGN PATENT DOCUMENTS

JP      02100213 A  *  4/1990
JP      05320588 A  * 12/1993
(Continued)

OTHER PUBLICATIONS

Jul. 2, 2012 Office Action issued in U.S. Appl. No. 12/224,315.
(Continued)

*Primary Examiner* — William Bell
(74) *Attorney, Agent, or Firm* — Oliff PLC

(57) ABSTRACT

A molded resin product includes a substrate made of a transparent resin, opaque coating film disposed on rear surface of the substrate except for an area set aside for a patterned portion, a transparent resin material disposed in the area set aside for the patterned portion on the rear surface of the substrate, and an opaque reflection coating or a half-reflective coating laminated to the transparent resin material. Under this configuration, the patterned portion looks as if it pops up from the rear surface of the substrate. If a half-reflective coating is used, the pattern is visible through the half-reflective coating when the pattern is viewed from the rear surface of the lid of a molded resin product.

18 Claims, 8 Drawing Sheets

(51) Int. Cl.
  *B32B 27/00*  (2006.01)
  *C08J 7/06*  (2006.01)

(56) References Cited

U.S. PATENT DOCUMENTS

| | | | |
|---|---|---|---|
| 4,826,713 A | | 5/1989 | Cook |
| 4,920,039 A | * | 4/1990 | Fotland et al. ............... 430/324 |
| 5,189,531 A | | 2/1993 | Palmer et al. |
| 5,192,609 A | | 3/1993 | Carroll, Jr. |
| 5,234,744 A | | 8/1993 | Kenmochi |
| 5,296,340 A | | 3/1994 | Tsukada et al. |
| 5,333,549 A | * | 8/1994 | Feldman ...................... 101/483 |
| 5,811,174 A | | 9/1998 | Murakami |
| 6,227,208 B1 | | 5/2001 | Imbert |
| 6,276,723 B1 | * | 8/2001 | Willard ........................... 283/34 |
| 6,490,819 B1 | | 12/2002 | Kumata et al. |
| 6,936,783 B2 | | 8/2005 | Kawaguchi et al. |
| 6,953,543 B2 | | 10/2005 | Maio et al. |
| 2001/0019761 A1 | | 9/2001 | Iriyama |
| 2003/0205895 A1 | * | 11/2003 | Scarbrough et al. ............ 283/91 |
| 2004/0047024 A1 | * | 3/2004 | Mortarotti ..................... 359/296 |
| 2005/0186400 A1 | * | 8/2005 | Kasperchik et al. ....... 428/195.1 |

FOREIGN PATENT DOCUMENTS

| | | |
|---|---|---|
| JP | U-06-042153 | 2/1994 |
| JP | A-06-286397 | 10/1994 |
| JP | A-2000-127196 | 5/2000 |
| JP | A-2006-001159 | 1/2006 |
| JP | A-2006-061430 | 3/2006 |

OTHER PUBLICATIONS

Jul. 10, 2007 International Search Report issued in PCT/JP2007/057272.
Feb. 1, 2013 Office Action issued in U.S. Appl. No. 12/224,315.
Sep. 12, 2014 Office Action issued in U.S. Appl. No. 14/015,565.
Apr. 1, 2015 Office Action issued in U.S. Appl. No. 14/015,565.

* cited by examiner

MOLDED RESIN PRODUCT AND PROCESS FOR SURFACE TREATMENT THEREOF

This is a Divisional of application Ser. No. 12/224,315 filed Aug. 22, 2008, which in turn is a National Phase of PCT/JP2007/057272 filed Mar. 30, 2007, which claims the benefit of Japanese Patent Application Nos. 2006-099176 filed Mar. 31, 2006; 2006-125619 filed Apr. 28, 2006; and 2006-179454 filed Jun. 29, 2006. The disclosures of the prior applications are hereby incorporated by reference herein in their entirety.

TECHNICAL FIELD

This invention relates to a molded resin product having a pattern formed on the surface in such a way that the pattern looks as if it pops up from the background, and to a process for surface treatment of the molded resin product having a stereoscopic pattern formed on the resin surface.

BACKGROUND ART

In the field of cosmetic containers, metallic decorations have been in use for improved appearance. The containers are treated by a hot stamping method to apply metallic decorations stereoscopically to the containers.

Printing has also been utilized to allow a letter/letters or a pattern/patterns to pop up on the surface and thus to give atmosphere of quality products to the containers.

[Patent document 1] Published patent application JP1994-286397A

DISCLOSURE OF THE INVENTION

Problems To Be Solved By the Invention

However, if asperity was given to the surfaces of the container, a problem of higher cost arose because the mold required additional working. In addition, hot stamping was time-consuming.

On the other hand, those containers having been given a three-dimensional appearance by means of printing can be manufactured at a low cost because asperity need not be formed on the surfaces, but the surfaces are apt to give a flat impression. It was very difficult to give the container a three-dimensional appearance through the printing means without forming asperity on the surfaces and to obtain a resin-made container having atmosphere of a quality product.

An object of this invention is to provide a molded resin product having atmosphere of a quality product as a result of a stereoscopic pattern that is formed on the container surfaces by a simple method such as coating or vapor deposition. Another object of this invention is to provide a surface treatment process for laying a stereoscopic pattern of high quality on the resin surfaces.

Means Of Solving the Problems

Intended to give solutions to the above problems, this invention comprises a molded resin product and a process for surface treatment thereof, as will be described below.

The molded resin product of this invention comprises a substrate made of a transparent resin, opaque coating film disposed on the rear surface of the substrate except for an area set aside for the patterned portion, a transparent resin material disposed on the rear surface of the substrate in the area set aside for the patterned portion, and an opaque reflection coating or a half-reflective coating disposed on the rear surface of the transparent resin material.

The substrate is a molded product made of a transparent resin used to mold resin product components, such as the container body and the lid. The substrate would be suitable as long as it transmits light, and may be colored. Thickness of the substrate is not specifically limiting. The thickness may not be uniform but can be varied. In addition, the substrate may not be flat but can be curved in a given shape, or may be molded into a desired shape.

Opaque coating film is formed by applying a colored coating material on the rear surface of the substrate. The color of the coating material is not limited, but preferably the coating material has a dark color such as black. A patterned portion is formed by not allowing the coating film to be left on the substrate. For example, the coating material is applied to the entire rear surface of the substrate, and then laser beam is irradiated to the patterned portion to remove the coating film therefrom. Or printing may be used to apply the coating film to the areas other than the patterned portion, and the patterned portion is formed by the remaining areas where no coating film has been printed. If a patterned area is formed by printing, use is made of serigraph. The patterned portion thus formed remains as transparent as the substrate. The substrate corresponding to the patterned portion has a smooth surface.

The patterned portion may also be formed by applying a thin film onto the rear surface of the substrate wherein the thin film have a cutting-out portion of the shape of the pattern.

The transparent resin material made of a transparent ink or resin is disposed so as to embed the pattern in the area where there is no coating film. The layer of this material on the rear surface of the substrate is formed to have the same thickness as the coating film and to have a flat surface. However, this thickness of the transparent resin material may be reduced to a level thinner than the thickness of the coating film, or may be increased and disposed so as to embed the coating film. Alternatively, the layer of the transparent resin material may be formed by serigraph so as to have a roughly uniform thickness and to cover the respective surfaces of both the coating film and the substrate in a continuous manner over a wide area including the patterned portion.

Like the substrate, the transparent resin material, too, may be colored as long as it is transparent. An additive or additives may be incorporated into the inside of the transparent resin material. As the additives, there may be mentioned a lame material having high light reflectivity or a particulate member of a certain color. The particulate materials are not limited to spherical fine particles but may have certain shapes such as needles, flakes, or stars. The additive may be uniformly incorporated inside the transparent resin material, or may be concentrated in the upper portion or precipitated in the lower portion by changing its specific gravity. The additive may not be light-reflective or may have a certain color or colors.

It is preferred that, regarding material quality, the transparent resin material has a refractive index different from that of the substrate. Different refractive indexes cause a part of light to reflect on the boundary surface between the transparent resin material and the substrate. Thus, incident light (including reflected light) is refracted when the light passes through this boundary surface.

Opaque reflection coating is preferably in the form of a reflective surface or a mirror surface. This coating may also be made of highly reflective, bright colored film. The reflective or mirror surface is formed by, for example, vapor deposition of a metal. The opaque reflection coating is formed in the area corresponding to at least a patterned portion on the rear surface of the substrate, but may also be formed directly on the rear surface of the substrate under the condition that there is no layer of the transparent resin material in the patterned portion.

The opaque reflection coating may be formed by coating the patterned portion with paint or by applying opaque sheet-like film having a reflective surface to the patterned portion. Hot stamping, for example, is used to apply the film to the patterned portion. The opaque reflection coating is transferred from transfer foil to the substrate over a wide area including the patterned portion.

In addition, opaque reflection coating may be formed on the rear surface of the substrate by pasting a resin member having a reflective surface to that rear surface or by combining such a member with another coating. In all these cases, the opaque reflection coating may also be colored on the surface.

A half-reflective coating is a film provided with a half-reflective surface on the transparent resin material side. The half-reflective coating is a member also referred to as a half mirror. It has a property of reflecting a part of the light incoming from the reflective surface and partly transmitting the rest of the light to the rear side. The half-reflective coating is formed by depositing a metal composition onto the surface of, for example, a resin film. In that case, the metal is not deposited completely until a perfect reflective surface is formed on the resin film, but the deposition is stopped halfway to form a half-reflective coating on the resin surface. Reflectance or transmittance of the half-reflective coating is arbitrarily determined. For example, reflectance is set by using the color or brightness of the substrate or the opaque reflection coating as the standard. The reflectance of a half-reflective coating is set so that there is reflection of a part of light on the reflective side of the half-reflective coating and that a part of light is transmitted through the half-reflective coating to the rear side. The rear surface of the half-reflective coating or the rear side of the molded resin product may be tinged with a certain color as long as the coating is light-transmitting.

The half-reflective coating is formed at least in the patterned area on the rear surface of the substrate. This coating may be directly formed on the rear surface of the substrate under the condition that there is no transparent resin material in the patterned portion. The half-reflective coating may also be formed over the entire rear surface of the substrate, or may be formed in a predetermined shape after the patterned portion has been covered with a transparent resin material. In addition, the half-reflective coating may be combined with a total reflection coating. In that case, a half-reflective coating and a total reflection coating are newly formed.

The half-reflective coating may be formed by coating the patterned portion with paint or by applying a sheet-like film having a half-reflective surface to the patterned portion. Hot stamping, for example, is used to apply the film to the patterned portion. The half-reflective coating is transferred from transfer foil to the substrate over a wide area including the patterned portion.

In addition, the half-reflective coating may be formed on the rear surface of the substrate by pasting a resin member having a half-reflective surface to that rear surface or by combining such a member with another coating.

The half-reflective coating may have a colored reflective surface. The coating film having a reflective surface or the resin member (a substrate for the half-reflective coating) may also be colored. In either way, the patterned portion having a predetermined color is formed on the rear side of the molded resin product.

The resin product of this invention is applicable not only to containers but also to other resin products such as carved ornament, or to product parts, such as dial plates, switches, or knobs.

The molded resin product formed by the above process may be utilized by pasting it to the surface of a product or by embedding it in the surface of a product. An additive having light reflectivity may be incorporated into the substrate and the coating film, as incorporated to the transparent resin material.

Effects of the Invention

In the case of the molded resin product of this invention, the patterned portion, i.e., the area filled with the transparent resin material, looks as if the pattern pops up from the rear surface of the substrate. The pattern is highly visible as it is reflected against the dark-colored background of the coating film. Furthermore, an illusion is created and given to human eyes because of a difference in refractive index between the substrate and the transparent resin material. The opaque reflection coating or the half-reflective coating laid between the substrate and the layer of the transparent resin material looks as if it is not on the rear side of the substrate but is above the rear surface of the substrate.

If the opaque reflection coating or the half-reflective coating is formed in mirror finish, the pattern has glaze and looks as if it pops up from the coating film, especially when the coating film is black- or dark-colored. In addition, there are cases where the transparent resin material looks as if it has the color of the opaque reflection coating or the half-reflective coating, thus giving atmosphere of high quality to the container.

The molded resin product may happen to be, for example, the lid of a container or a part of an article wherein the rear surface is also visible when the product is opened. In such a case, a half-reflective coating is utilized to form a stereoscopic pattern on the lid surface. And when the lid is opened, the same pattern is also visible on the rear surface of the lid due to the light that has transmitted through the half-reflective coating. Therefore, from the outer surface of the molded resin product, it is impossible to look inside through the patterned portion because of the half-reflective coating that reflects a part of light, and a stereoscopic pattern pops up on the surface. And from the rear surface of the molded resin product, there appears the pale or dark see-through pattern on the rear surface of the molded resin product.

The reflective surface of the half-reflective coating may be formed in a reverse manner so that the upper surface of the molded resin product becomes the rear surface, and vice versa.

The molded resin product of this invention having a stereoscopic pattern can be manufactured at a low cost because the substrate is molded from a transparent resin, followed by mere surface treatment on the rear surface. Any desired appearance can be obtained by picking out a resin of any appropriate color for the substrate, the coating film, the transparent resin material, the opaque refraction coating, and/or the half-reflective coating.

EXPLANATION OF CODES

Figure 1:
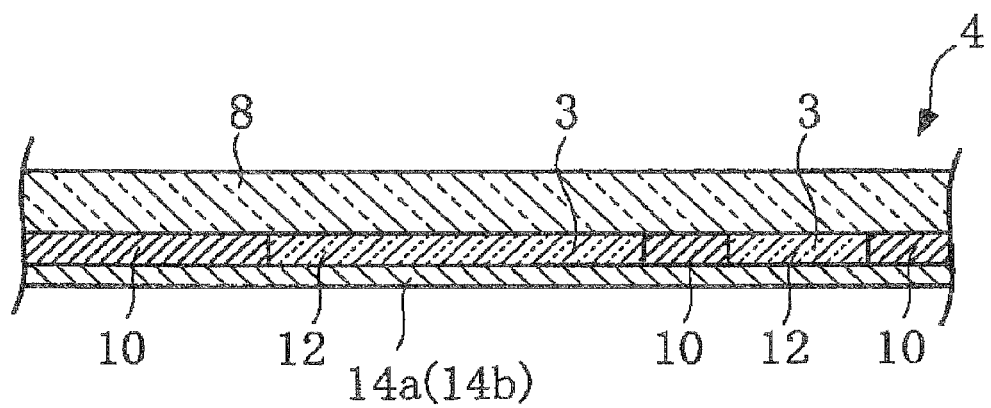
FIG. 1 is a sectional view of the molded resin product in one embodiment of this invention.
Figure 2:
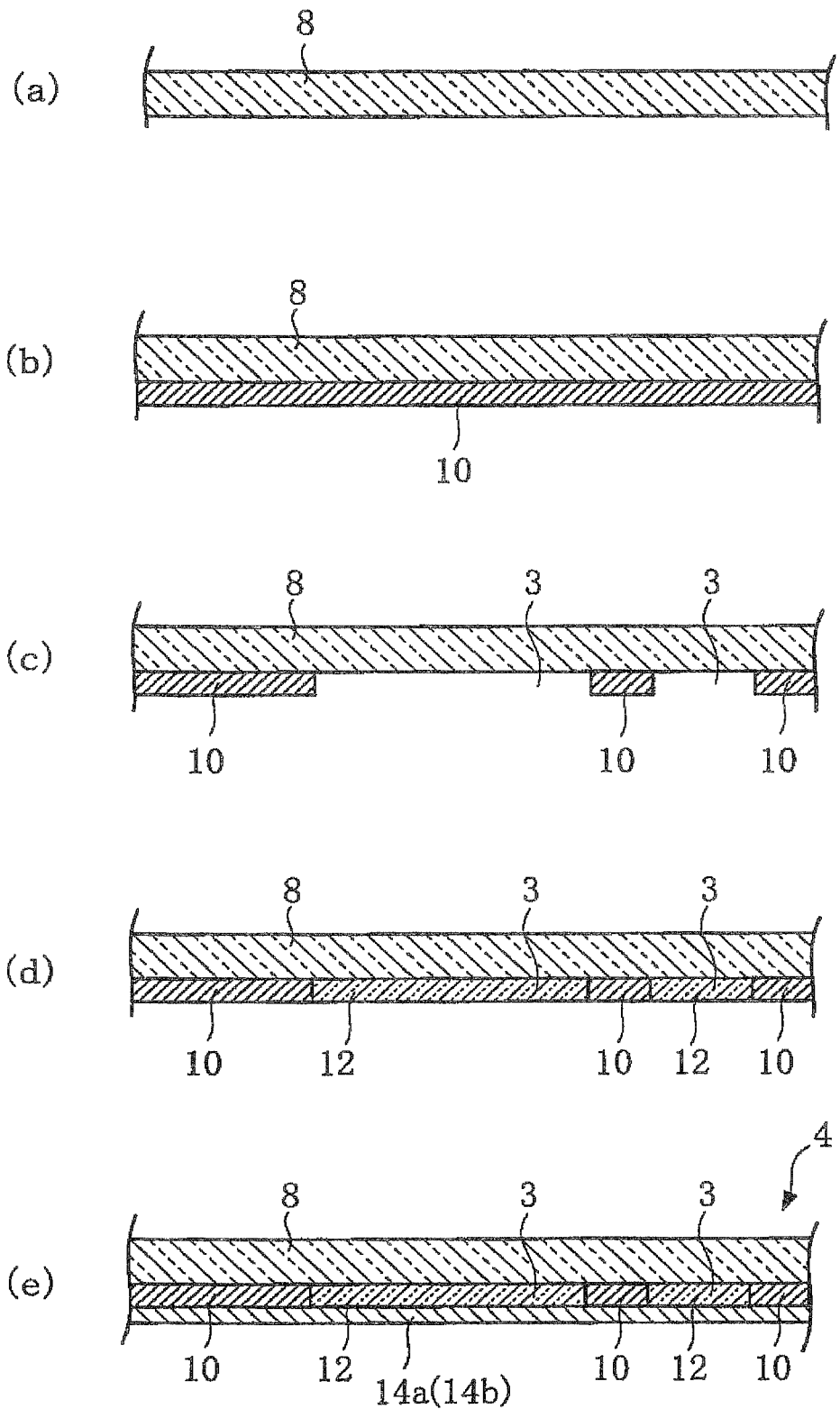
FIGS. 2(a)-(e) are explanatory diagrams showing the surface treatment process of this invention.

1. Cosmetic container
3. Patterned portion
4. Lid
6. Container body
8. Substrate
10. Coating film
12. Transparent resin material
14a. Reflection coating
14b. Half-reflective coating
15a. Reflecting member
15b. Half-reflecting member
16. Resin member
17a. Reflecting member
17b. Half-reflecting member
18. Flake

PREFERRED EMBODIMENTS OF THE INVENTION

This invention is further described with respect to preferred embodiments of this invention, now referring to the drawings (FIGS. 1-13). FIGS. 1-11 show some members coded with 14a (14b), 15a (15b), 17a (17b), etc. These codes accompanied by the codes in parentheses indicate that the member is a reflection coating 14a or a half-reflective coating 14b; a reflecting member 15a or a half-reflecting member 15b; or a reflecting member 17a or a half-reflecting member 17b.

Figure 12:
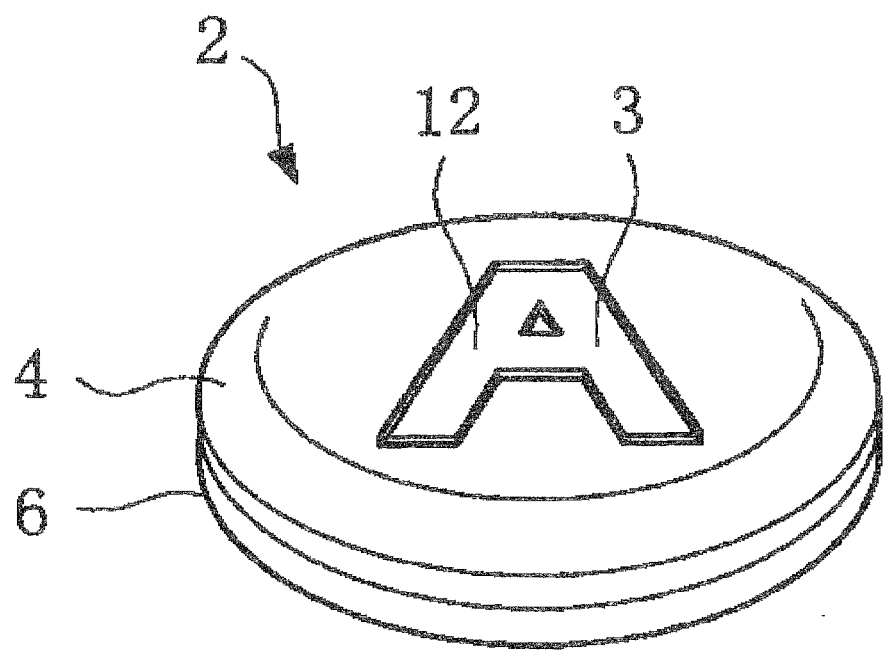
FIG. 12 is a perspective view showing the entire cosmetic container.

FIG. 12 shows a cosmetic container 2 for which the surface treatment process of this invention has been used. The cosmetic container 2 is a molded resin product and comprises a lid 4 and a main body 6 to which the lid 4 is fitted in a manner that the lid 4 can be opened or closed. The lid 4 has a pattern of A that has been formed by the surface treatment.

FIG. 1 shows a vertical section of a lid 4, which comprises a substrate 8, i.e., the portion determining the basic shape of the lid 4, a coating film 10 applied to the rear surface of the substrate 8, a transparent resin material 12 filled between two adjacent areas of the coating film, and a reflection coating 14a or a half-reflective coating 14b.

The substrate 8 is made of a transparent synthetic resin and is molded by, for example, injection molding. The coating film 10 is opaque and black in color. It is disposed in the area other than the patterned portion 3. In other words, the patterned portion 3 is formed by not laying the coating film 10 thereon.

The transparent resin material 12 is disposed in the patterned portion 3 where there is no coating film 10. The reflection coating 14a or the half-reflective coating 14b is formed uniformly on the surfaces of both the coating film 10 and the transparent resin material 12, with at least the surface of the lid 4 being used as the reflective or half-reflective surface.

If a half-reflecting coating 14b is used, the reflectance or transmittance is set at a value in such a range that the half-reflective coating 14b serves as the reflective surface to reflect light when the lid 4 is viewed from the upper surface, but that the patterned portion 3 is visible through the half-reflective coating 14b when the lid 4 is viewed from the rear surface.

The surface treatment process used for the lid 4 is described below.

A coating material is applied to the entire rear surface of the substrate 8 shown in FIG. 2(a). Thus, the coating film 10 is disposed over the entire rear surface of the substrate 8, as shown in FIG. 2(b). Then, the patterned portion 3, i.e., a letter A in FIG. 12, is irradiated with laser beam to remove the coating film 10 from this portion. The coating film 10 is left to stay in the area other than the patterned portion 3, where there has been no laser beam irradiation (FIG. 2(c)). The edges of the patterned portion 3 are smooth and vertical to the substrate 8, as shown in FIG. 2(c).

Then, the patterned portion 3 having no coating film 10 is filled with the transparent resin material 12, which is laid in the liquid state and is left to solidify in the patterned portion 3. The surface of the layer of the transparent resin material 12 is formed flatly at the same height as the coating film 10, as shown in FIG. 2(d).

The reflection coating 14a or the half-reflective coating 14b is uniformly formed on the surfaces of the coating film 10 and the transparent resin material 12, as shown in FIG. 2(e). The vapor deposition of a metal is used so that the reflection coating 14a or the half-reflective coating 14b has a reflective surface on the upper side of the lid 4.

Since the lid 4 receives the above-described surface treatment, the reflection coating 14a or the half-reflecting coating 14b is formed in the shape of the patterned portion 3. If one looks down at the cosmetic container 2, the glossy pattern A is visible against the background of the coating film 10. The pattern of A looks as if it pops up from the surface of the coating film 10.

Since the reflection coating 14a or the half-reflective coating 14b is formed on the rear surface of the transparent resin material 12, it is actually disposed under the coating film 10. But this reflection coating 14a or half-reflective coating 14b is appealing because it reflects light and happens to create an illusion to human eyes, as derived from a difference in refractive index between the substrate 8 and the transparent resin material 12. Thus, the pattern A looks as if it is disposed above the coating film 10.

Therefore, the cosmetic container 2 looks beautiful as the patterned portion 3 pops up on the surface of the black lid 4. In some cases, the transparent resin material 12 looks as if it is colored with a tinge of the coating film 10 under the effects of reflection or transmission. Thus, the surface treatment of this invention can create the atmosphere of a quality product.

Figure 13:
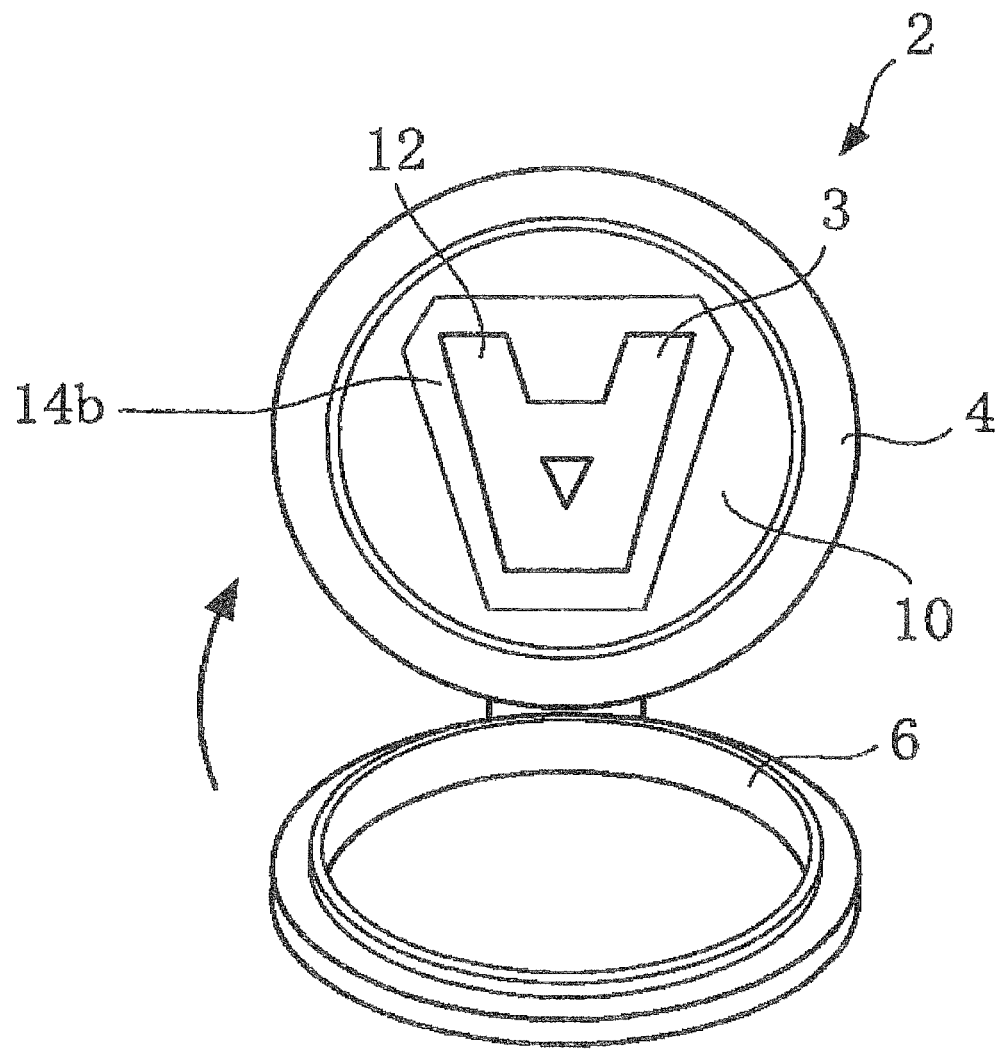
FIG. 13 is a perspective view of the cosmetic container of FIG. 12 in a state where the lid is opened.

If the halve-reflective coating 14b is used, light passes through the coating 14b because it has light transmittance. When the lid 4 is opened, the pattern A is visible half-transparently from the rear surface, as shown in FIG. 13. Since the pattern A is visible from the rear surface due to a part of light that has passed through the half-reflective coating 14b, the look of the pattern A from the rear surface gives different atmosphere. How the half-reflective coating 14b reflects light changes with the angle of the lid 4 that is opened or closed relative to the container body. As a result, image of the pattern A varies delicately as observed from the rear surface.

Although the coating film 10 was removed from the patterned portion 3 in the above embodiment, this invention is not limited to the embodiment described above. The patterned portion 3 may also be formed by printing the substrate 8 directly, e.g., by serigraph, while leaving a predetermined pattern to be outlined on the printed background.

Figure 3:
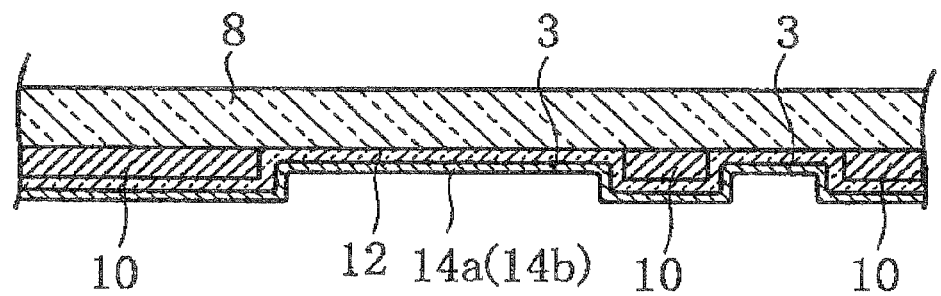
FIG. 3 is a sectional view of the molded resin product in another embodiment of this invention.

FIG. 3 shows another embodiment of the lid 4.

In this embodiment, the process of surface treatment goes on similarly up to the step of FIG. 2(c) in the first embodiment. Then, the transparent resin material 12 is formed at roughly uniform thickness on the surfaces of the coating film 10 and the substrate 8. The reflection coating 14a or the half-reflective coating 14b is also formed over the entire surface of the transparent resin material 12 in the same way as in the first embodiment. In this embodiment, the patterned portion 3 pops up just as it does in the first embodiment.

Figure 4:
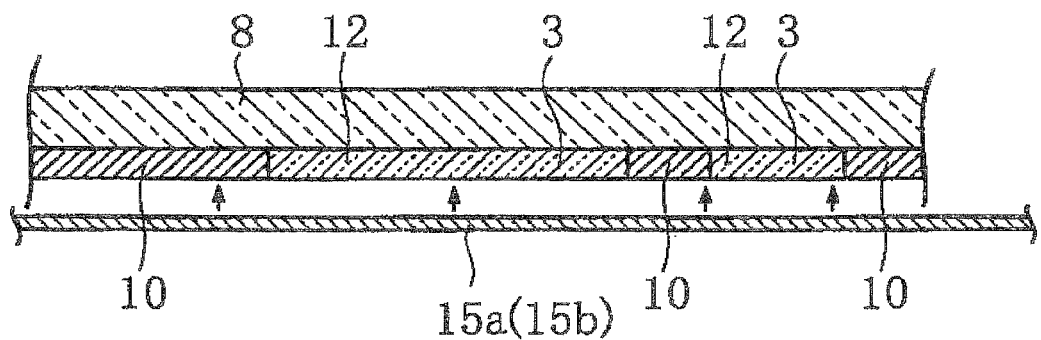
FIG. 4 is an explanatory diagram showing another embodiment of the surface treatment process.
Figure 5:
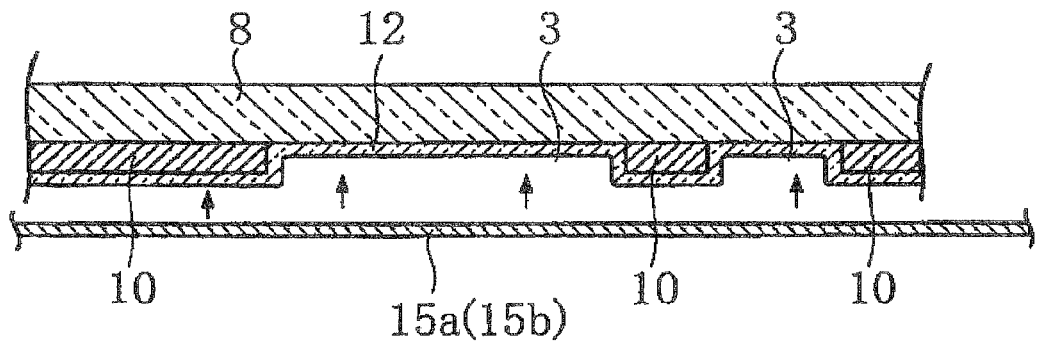
FIG. 5 is an explanatory diagram showing another embodiment of the surface treatment process.

FIGS. 4 and 5 show other embodiments of the surface treatment process applied to the lid 4.

In the embodiment shown in FIG. 4, a sheet-like reflecting member 15a or half-reflecting member 15b is used to form an opaque reflection coating or a half-reflective coating on the rear surface of the substrate 8. The steps have gone similarly up to FIG. 2(d) as in the first embodiment, and in the next step, the reflecting member 15a or the half-reflecting member 15b is laid over both surfaces of the coating film 10 and the transparent resin material 12.

The reflecting member 15a or the half-reflecting member 15b is a thin film member, and the reflective or half-reflective surface has been formed on the side facing the substrate 8. The reflecting member 15a or the half-reflecting member 15b is adhered to the surfaces of the coating film 10 and the transparent resin material 12 by using an adhesive agent.

Thus, the opaque reflection coating or the half-reflective coating of these embodiments is formed in the patterned portion 3 of the lid 4, giving the same effect as in the first embodiment.

In the embodiment shown in FIG. 5, the process of surface treatment goes on similarly up to the step of FIG. 2(c) as in the first embodiment. Then, the transparent resin material 12 is formed at roughly uniform thickness on the surfaces of the coating film 10 and the substrate 8. A reflecting member 15a or a half-reflecting member 15b is laid over the surface of the transparent resin material 12. The reflecting member 15a or the half-reflecting member 15b is a thin film member, and the reflective or half-reflective surface is formed on the side facing the substrate 8. The reflecting member 15a or the half-reflecting member 15b is adhered to the surface of the transparent resin material 12 by using an adhesive agent.

Figure 6:
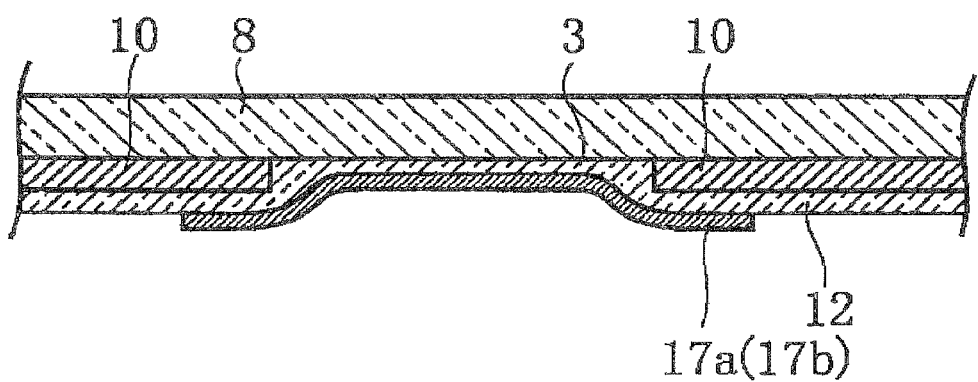
FIG. 6 is an explanatory diagram showing another embodiment of the molded resin product.
Figure 7:
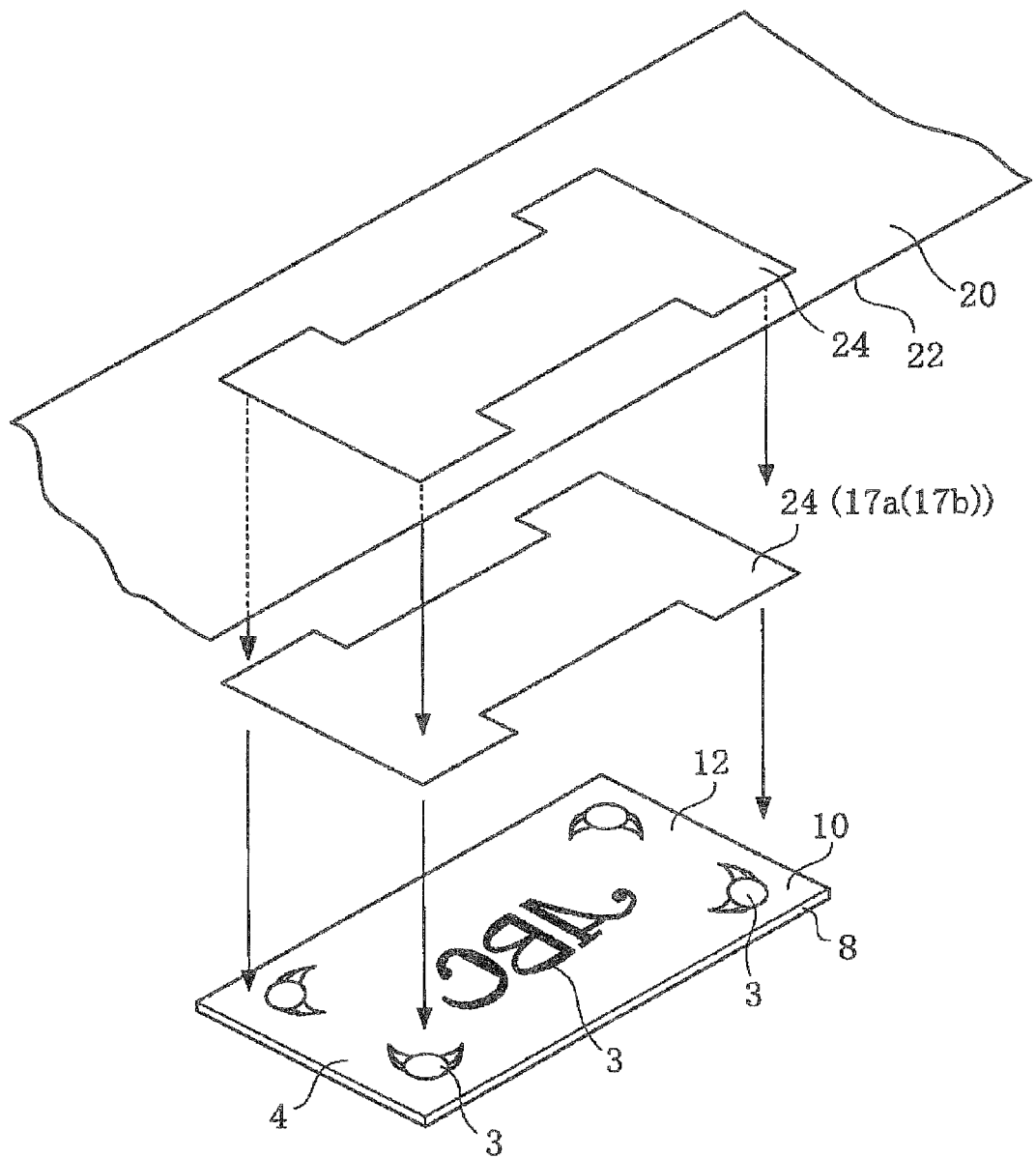
FIG. 7 is an exploded view showing another embodiment of the surface treatment process.
Figure 8:
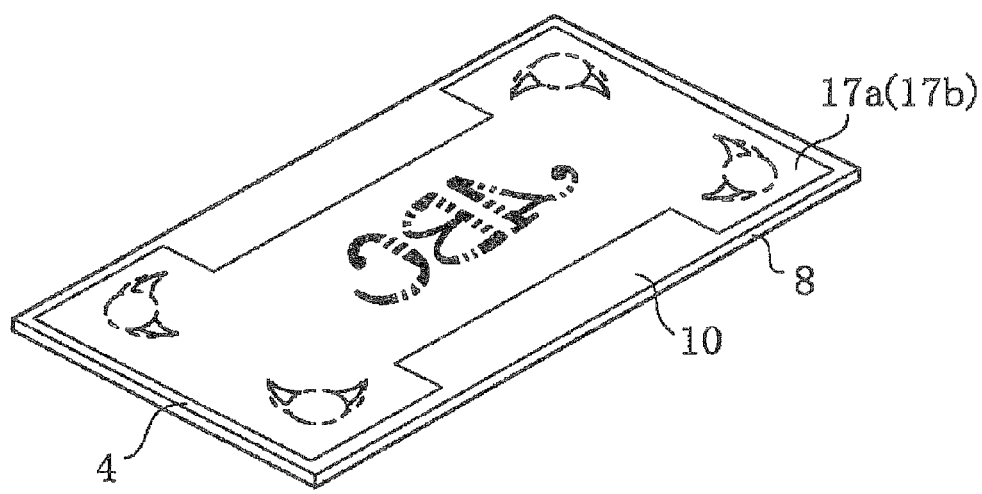
FIG. 8 is a full perspective view of the molded resin product in another embodiment of this invention.

FIG. 6 shows an embodiment in which a reflecting member 17a or a half-reflecting member 17b is disposed on the surface of the transparent resin material 12 by using the hot stamping method. In this embodiment, the coating film 10 is disposed on the substrate 8 except in the patterned portion 3, and the transparent resin material 12 is applied to roughly entire surface of the substrate 8. Thereafter, as shown in FIG. 7, the reflecting member 17a or the half-reflecting member 17b is transferred from transfer foil 20 and is applied to the patterned portion 3 by using hot stamping. The transfer foil 20 comprises a thin film material 24 laminated on a sheet-like substrate 22. When a heated die (not shown) is pressed onto the transfer foil 20, the thin film material 24 is broken away from the substrate 22 in the shape of the die, and is attached to a target layer, such as the substrate 8. The reflecting member 17a or the half-reflecting member 17b is provided with a reflective surface or a half-reflective surface on the side facing the substrate 8 in the same way as described above, and is attached to the rear surface of the substrate 8 over a wide area including the patterned area 3, as shown in FIG. 8.

This embodiment, too, gives the same effect as observed in the first embodiment described above because the opaque reflection coating or the half-reflective coating is formed similarly in the patterned portion 3 of the lid 4.

In addition, the reflecting member 15a, 17a or the half-reflective member 15b, 17b may be laid over the surface of the transparent resin material 12 by using hot stamping or other printing methods. The reflecting member 15a, 17a or the half-reflective member 15b, 17b need not be in close contact with the surface of the transparent resin material 12, but may have void in corners. Furthermore, there may be air spaces between the transparent resin material 12 and the reflecting member 15a, 17a or the half-reflective member 15b, 17b. Although the reflecting member 15a, 17a or the half-reflective member 15b, 17b may be laid over the surface of the transparent resin material 12 by using hot stamping, laying of such a member is not limited to the embodiment shown in FIG. 6. The hot stamping method may be utilized in a case where the transparent resin material 12 is made of an ink and is formed at the same height as the coating film 10.

Figure 9:
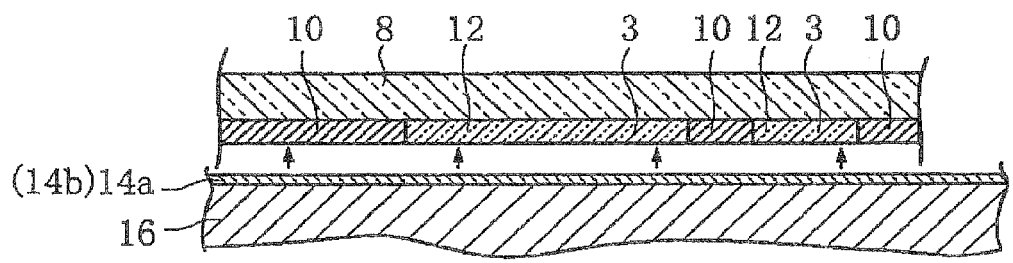
FIG. 9 is an explanatory diagram showing another embodiment of the surface treatment process.
Figure 10:
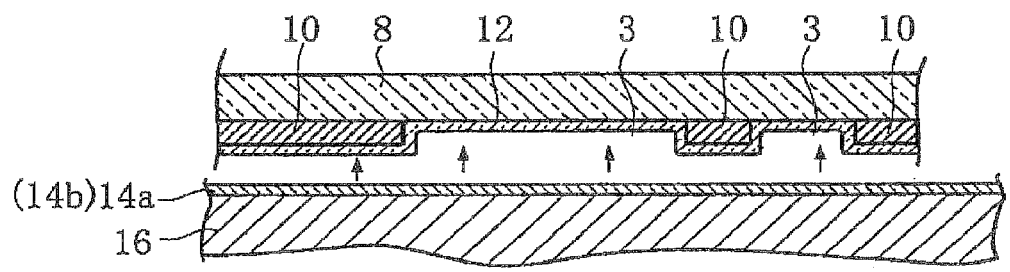
FIG. 10 is an explanatory diagram showing another embodiment of the surface treatment process.

FIGS. 9 and 10 show still other embodiments, in which the reflection coating 14a or the half-reflective coating 14b is formed on one surface of a resin member 16 and is attached to the rear surface of the substrate 8 to form the opaque reflection coating or the half-reflective coating. The resin member 16 can be formed in advance so as to be adapted to the shape of rear surface of the substrate 8 or can be flexible so as to deform appropriately according to the shape of the rear surface of the substrate 8.

In FIGS. 9 and 10, the configurations of the coating film 10 and the transparent resin material 12 attached to the substrate 8 are similar to those described for FIGS. 4 and 5. The resin member 16 is fitted to the substrate 8 by adhesion or assembly. The fitting method is not restricted specifically.

The same effect as described above can be achieved by forming the refection coating or the half-reflective coating on the resin member 16 and fitting the member 16 to the substrate 8 to form an opaque reflection coating or a half-reflecting coating over the patterned portion 3. Furthermore, a stereoscopic pattern may be formed by allowing the resin member 16 to configure the basic shape of a molded resin product according to this invention and by fitting the resin member 16 to the substrate 8.

Figure 11:
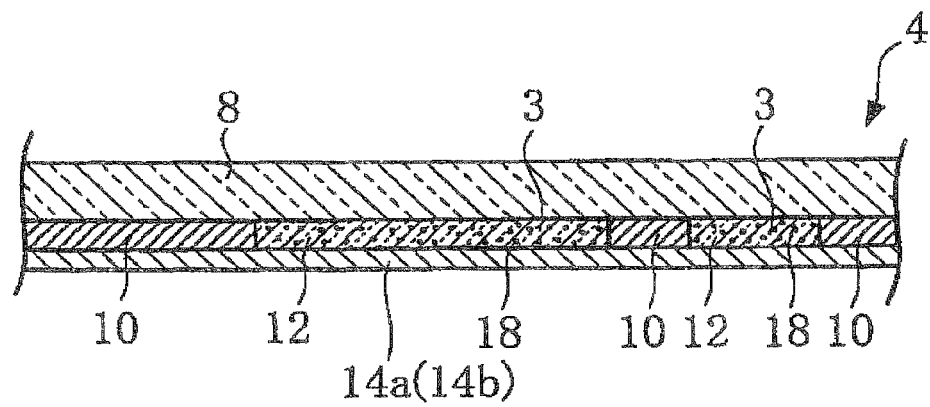
FIG. 11 is a sectional view of the molded resin product in another embodiment of this invention.

FIG. 11 shows still another embodiment. In this embodiment, small flakes 18 having light reflectivity are incorporated into the transparent resin material 12. The flakes 18 may be mixed in advance with the transparent resin material 12; or mixed with the transparent resin material 12 after it has been applied to the substrate 8. This enables light to be reflected inside the transparent resin material 12 with which the patterned portion 3 is filled up. Therefore, the patterned portion 3 can have new atmosphere that is different from the patterned portion 3 described above.

If a half-reflective coating 14b is utilized, the patterned portion 3 having flakes 18 incorporated therein can be seen through the half-reflective coating 14b when the lid 4 is viewed from the rear surface.

The incorporation of such light-reflective flakes 18 may be used for the lid 4 that is formed by either method shown in FIG. 9 or 10. Flakes are flat, thin pieces, but they may also have such shapes as particles, needles, or stars, as determined previously. The flakes may not be reflective to light, but have a certain color or colors.

In addition, light-reflective flakes may be incorporated into the substrate 8 or the coating film 10 in the same manner as with the transparent resin material 12.

In the case of FIG. 10, the reflection coating 14*a* or the half-reflective coating 14*b* is preferably attached closely to the surface of the transparent resin material 12, but the close contact is not always necessary, and some gap or air space may exist between the transparent resin material 12 and the reflection coating 14*a* or the half-reflective coating 14*b*.

The patterned portion 3 is not limited to the letter A. Moreover, letters or patterns may have been formed in advance on the surface of the reflection coating 14*a* or the half-reflective coating 14*b* or the reflecting member 15*a*, 17*a* or the half-reflecting member 15*b*, 17*b*.

The reflecting member 15*a*, 17*a* or the reflection coating 14*a* on the resin member 16 may not be a reflective surface but can be a painted surface.

The state of reflection from the surface of a half-reflective coating 14*b* or the state of light transmission as seen from the rear surface thereof may be given a variety by overlaying a total reflection coating over a part of the half-reflective coating 14*b*.

The invention claimed is:

1. A process for surface treatment of a molded resin product, comprising:
    disposing an opaque coating film on a rear surface of a substrate made of a transparent resin, except for an area set aside for a patterned portion,
    filling the area set aside for the patterned portion with a transparent resin material after the opaque coating film is disposed on the rear surface of the substrate, the transparent resin material being formed flatly at the same height as the opaque coating film, and
    forming a half-reflective coating in a predetermined shape that covers at least a rear surface of the transparent resin material, so that a stereoscopic pattern or patterns is/are formed on an upper surface of the substrate and can be seen through the rear surface of the substrate.

2. The process for surface treatment of a molded resin product according to claim 1, wherein the opaque coating film is laid over an entire rear surface of the substrate and removed from the area set aside for the patterned portion by irradiating the opaque coating film with a laser beam.

3. The process for surface treatment of a molded resin product according to claim 1, wherein the opaque coating film is formed on the rear surface of the substrate by printing the opaque coating film in areas other than the area set aside for the patterned portion.

4. The process for surface treatment of a molded resin product according to claim 1, wherein the transparent resin material is an ink, and the ink is embedded in the patterned portion as a transparent resin material.

5. The process for surface treatment of a molded resin product according to claim 1, wherein an additive is incorporated into the transparent resin material.

6. The process for surface treatment of a molded resin product according to claim 1, comprising:
    disposing a half-reflecting member having at least a half-reflective surface on the rear surface of the substrate so as to form the half-reflective coating on the patterned portion.

7. The process for surface treatment of a molded resin product according to claim 6, wherein a total reflection coating is formed in a part of the half-reflective coating with which the patterned portion is provided.

8. The process for surface treatment of a molded resin product according to claim 1, wherein the half-reflective coating is formed by hot stamping.

9. The process for surface treatment of a molded resin product according to claim 1, wherein the transparent resin material in the patterned portion is devoid of any material of the opaque coating film in a thickness direction between the rear surface of the substrate and the half-reflective coating.

10. A process for surface treatment of a molded resin product, comprising:
    disposing an opaque coating film on a rear surface of a substrate made of a transparent resin, except for an area set aside for a patterned portion,
    disposing a transparent resin material on the rear surface of the substrate in the area set aside for the patterned portion, the transparent resin material being formed flatly at the same height as the opaque coating film, and
    forming a half-reflective coating in a predetermined shape that covers at least a rear surface of the transparent resin material, so that a stereoscopic pattern or patterns is/are formed on an upper surface of the substrate and can be seen through the rear surface of the substrate,
    wherein the opaque coating film and transparent resin material do not overlap in a thickness direction.

11. The process for surface treatment of a molded resin product according to claim 10, wherein the opaque coating film is laid over an entire rear surface of the substrate and removed from the area set aside for the patterned portion by irradiating the opaque coating film with a laser beam.

12. The process for surface treatment of a molded resin product according to claim 10, wherein the opaque coating film is formed on the rear surface of the substrate by printing the opaque coating film in areas other than the area set aside for the patterned portion.

13. The process for surface treatment of a molded resin product according to claim 10, wherein the transparent resin material is an ink, and the ink is embedded in the patterned portion as a transparent resin material.

14. The process for surface treatment of a molded resin product according to claim 10, wherein an additive is incorporated into the transparent resin material.

15. The process for surface treatment of a molded resin product according to claim 10, comprising:
    disposing a half-reflecting member having at least a half-reflective surface on the rear surface of the substrate so as to form the half-reflective coating on the patterned portion.

16. The process for surface treatment of a molded resin product according to claim 15, wherein a total reflection coating is formed in a part of the half-reflective coating with which the patterned portion is provided.

17. The process for surface treatment of a molded resin product according to claim 10, wherein the half-reflective coating is formed by hot stamping.

18. The process for surface treatment of a molded resin product according to claim 10, wherein the transparent resin material in the patterned portion is devoid of any material of the opaque coating film in a thickness direction between the rear surface of the substrate and the half-reflective coating.

* * * * *